(12) United States Patent
Wasserman et al.

(10) Patent No.: US 9,957,834 B2
(45) Date of Patent: May 1, 2018

(54) ROTOR BLADE TIP CLEARANCE

(71) Applicant: United Technologies Corporation, Hartford, CT (US)

(72) Inventors: David J. Wasserman, Hamden, CT (US); Michael G. McCaffrey, Windsor, CT (US); Michael G. Abbott, Jupiter, FL (US)

(73) Assignee: United Technologies Corporation, Farmington, CT (US)

(*) Notice: Subject to any disclaimer, the term of this patent is extended or adjusted under 35 U.S.C. 154(b) by 687 days.

(21) Appl. No.: 14/492,737

(22) Filed: Sep. 22, 2014

(65) Prior Publication Data
US 2015/0252686 A1 Sep. 10, 2015

Related U.S. Application Data

(60) Provisional application No. 61/886,426, filed on Oct. 3, 2013.

(51) Int. Cl.
F01D 11/14 (2006.01)
F01D 21/00 (2006.01)
F01D 11/12 (2006.01)

(52) U.S. Cl.
CPC .......... F01D 21/003 (2013.01); F01D 11/12 (2013.01); F05D 2250/232 (2013.01); F05D 2260/80 (2013.01); Y02T 50/672 (2013.01)

(58) Field of Classification Search
CPC .............................. F01D 11/12; F01D 11/122
USPC ............................................ 415/173.4, 174.4
See application file for complete search history.

(56) References Cited

U.S. PATENT DOCUMENTS

| 8,684,669 B2* | 4/2014 | Chehab | F01D 11/122 415/118 |
|---|---|---|---|
| 9,464,536 B2* | 10/2016 | Zhang | F01D 11/006 |
| 9,528,443 B2* | 12/2016 | Razzell | F02C 7/12 |
| 9,598,969 B2* | 3/2017 | Wada | F01D 11/02 |
| 2016/0084102 A1* | 3/2016 | Pabla | F01D 11/122 415/173.4 |

* cited by examiner

Primary Examiner — Logan Kraft
Assistant Examiner — Jason Fountain
(74) Attorney, Agent, or Firm — Kinney & Lange, P.A.

(57) ABSTRACT

A system includes, in one example, a shroud configured to circumscribe a plurality of rotor blades of a gas rotor engine, and at least one rub button including a head portion having a height configured to extend into a flow path region of the shroud along a central axis of the rub button that extends radially into the flow path region. The head portion includes a profile, orthogonal to the central axis, that varies according to a defined function of the height of the head portion.

18 Claims, 5 Drawing Sheets

ROTOR BLADE TIP CLEARANCE

CROSS-REFERENCE TO RELATED APPLICATION(S)

This application claims priority from U.S. Provisional Application No. 61/886,426, filed Oct. 3, 2013 and entitled "ROTOR BLADE TIP CLEARANCE", the entire contents of which are hereby incorporated by reference.

BACKGROUND

The present disclosure relates to gas turbine engines, and in particular to determining a tip clearance of rotor blades of a gas turbine engine.

Many aircraft and industrial power generators use gas turbine engines to generate thrust and/or electrical power. Generally, gas turbine engines include a fan section, a compressor section, a combustor section and a turbine section. The fan section drives air along a bypass flow path while the compressor section draws air in along a core flow path where air is compressed and communicated to the combustor section. In the combustor section, air is mixed with fuel and ignited to generate a high pressure exhaust gas stream that expands through the turbine section where energy is extracted by turbine blades and utilized to drive the fan section and the compressor section.

Measurements of the tip clearance of rotor blades (e.g., turbine blades) within the gas turbine engine can be important for evaluating cycle efficiencies and engine performance. Gaps between a tip of the rotor blade and an engine shroud can permit air to pass over the tip rather than through the blades, thereby resulting in leakage and inefficiency. Conversely, a rotor blade that contacts (or rubs) the shroud or coating during operation can remove material from the blade tip and/or generate undesirable heat, which can have negative consequences.nsert text]

SUMMARY

In one example, a system includes a shroud configured to circumscribe a plurality of rotor blades of a gas turbine engine, and at least one rub button including a head portion having a height configured to extend into a flow path region of the shroud along a central axis of the rub button that extends radially into the flow path region. The head portion includes a profile, orthogonal to the central axis, that varies according to a defined function of the height of the head portion.

In another example, a method of determining a tip clearance between a plurality of rotor blades of a gas turbine engine and a shroud configured to circumscribe the plurality of rotor blades includes positioning at least one rub button at the shroud. The at least one rub button includes a head portion having a height configured to extend into a flow path region of the shroud along a central axis of the rub button that extends radially into the flow path region. The head portion includes a plurality of known dimensions and a profile, orthogonal to the central axis, that varies according to a defined function of the height of the head portion. The method further includes capturing an image of the head portion of the at least one rub button, and measuring, from the image of the head portion, at least one dimension of the profile of the head portion to determine at least one image dimension of the profile of the head portion. The method further includes determining the tip clearance of the plurality of rotor blades based at least in part on: a correlation between the at least one image dimension of the profile and at least one of the known dimensions; and the defined function of the height of the head portion.

In another example, a rub button includes a head portion having a height that extends radially along a central axis of the rub button. The rub button further includes a tail portion, opposite the head portion, and a shank portion that extends along the central axis of the rub button from the tail portion to the head portion. The head portion includes a profile, orthogonal to the central axis, that varies according to a linear function of the height of the head portion.

DETAILED DESCRIPTION

According to techniques described herein, a tip clearance between a plurality of rotor blades (e.g., turbine blades, compressor blades, fan blades, and the like) and a shroud of a gas turbine engine can be determined using at least one rub button disposed at the shroud and configured to extend into a flow path region of the shroud. For example, as the rotor blades rotate within the flow path region of the shroud, the rotor blade tips can deform the rub button, thereby ablating (or "rubbing") material from a head portion of the rub button. As described herein, a profile of the head portion (e.g., a plan view of the head portion as viewed from the flow path region within the shroud) can vary according to a defined function of a height of the head portion. Accordingly, because the profile varies predictably with the height of the head portion, the "rubbed" portion (i.e., the amount of material ablated during rotation of the rotor blades), and hence the corresponding rotor blade tip clearance, can be determined from an image of the profile of the rub button, such as an image captured using a borescope device. As such, according to techniques described in this disclosure, a tip clearance of a plurality of rotor blades can be determined (e.g., during engine testing), thereby helping to achieve a design that decreases both rotor blade tip gaps and excess contact between the rotor blade tip and the shroud (or adjacent coating) during operation. In this way, techniques of this disclosure can help to increase cycle performance, efficiencies, and reliability of components of gas turbine engines. Moreover, rather than require disassembly of the engine and/or shroud to retrieve and measure the rub button, the techniques can enable the tip clearance measurements to be determined from an image of the rub button, thereby enabling more efficient and cost effective analyses.

Figure 1:
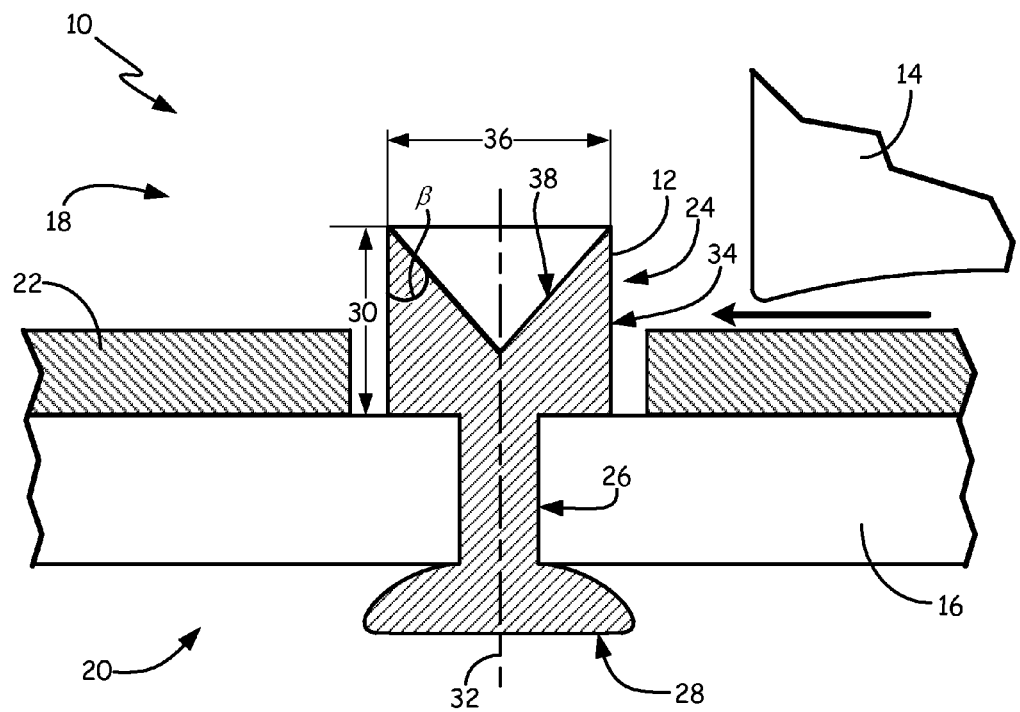
FIG. 1 is a cutaway view of a system including at least one rub button for determining a tip clearance between one or more rotor blades and a shroud of a gas turbine engine.

FIG. 1 is a cutaway view of a system 10 including at least one rub button 12 for determining a tip clearance between one or more rotor blades 14 and shroud 16 of a gas turbine engine. Shroud 16 can be configured to circumscribe rotor blades 14 (e.g., turbine blades of a gas turbine engine). In one embodiment, shroud 16 is configured to direct airflow through the section (e.g., a turbine section) where energy is extracted by the rotor blades and utilized to drive a fan section and compressor section of the gas turbine engine. That is, while illustrated in FIG. 1 as including one rotor blade 14, system 10 can include a plurality of rotor blades 14 that extend radially from a rotor disposed along a central axis of the section to enable rotor blades 14 to rotate circumferentially about the rotor within the air flow through the section. Accordingly, as illustrated in FIG. 1, shroud 16 can include flow path region 18 adjacent a flow of air through the shroud and non-flow path region 20 opposite flow path region 18. In some examples, such as the example of FIG. 1, system 10 can include coating 22 on a side of shroud 16 that is adjacent flow path region 18. Coating 22, in some examples, can be an abradable coating formed of an abradable material configured to wear upon contact with a tip of rotor blade 14. In other examples, system 10 may not include coating 22.

As further illustrated, rub button 12 can include head portion 24, shank portion 26, and tail portion 28. Head portion 24 can have height 30 configured to extend into flow path region 18 along central axis 32 of rub button 12. Tail portion 28, opposite head portion 24 along central axis 32, can be configured to be disposed at non-flow path region 20 of shroud 16. Shank portion 26 can extend from tail portion 28 to head portion 24 (e.g., through shroud 16). That is, shank portion 26 can, in certain examples, have a height extending along central axis 32 that is greater than (or equal to) a thickness of shroud 16. Shank portion 26 can have a diameter that is less than a diameter of both head portion 24 and tail portion 28, such that after installation, the diameters of head portion 24, shank portion 26, and tail portion 28 are configured to secure rub button 12 within shroud 16. In operation, rub button 12 can be installed much like a rivet. For example, rub button 12 can be installed by inserting shank portion 26 through shroud 16 (e.g., a hole drilled through shroud 16 having a diameter greater than or equal to a diameter of shank portion 26) from flow path region 18. In such an example, tail portion 28 can be formed by upsetting a portion of shank portion 26 that extends into non-flow path region 20, such as by applying pressure sufficient to deform the portion of shank portion 26 that extends into non-flow path region 20 to form tail portion 28.

In operation, as rotor blade 14 rotates circumferentially about the central axis of shroud 16 within flow path region 18, a tip of rotor blade 14 can contact head portion 24, thereby ablating (e.g., removing) a portion of head portion 24 that contacts rotor blade 14. Accordingly, rub button 12 can be formed of any material having properties sufficient to withstand a temperature of hot air flow through flow path region 18 without deforming, yet soft enough to deform and/or ablate upon contact with rotor blade 14 during operation of the gas turbine engine. Examples of such materials from which rotor blade 14 can be formed include, but are not limited to, platinum, ceramic, ceramic matrix composite materials, nickel, aluminum (e.g., for a fan section of the gas turbine engine), and steel.

Height 30 can, in certain examples, be less than a cold tip gap distance between rotor blades 14 and shroud 16 (e.g., in examples where system 10 does not include coating 22). In examples where system 10 includes coating 22, the cold tip gap distance between rotor blades 14 and coating 22 can be greater than a difference between height 30 and a thickness of coating 22. The cold tip gap distance can be a startup tip clearance (e.g., a tip clearance before operation of the gas turbine engine) between rotor blades 14 and shroud 16 or, in examples where system 10 includes coating 22, between rotor blades 14 and coating 22. That is, as rotor blades 14 rotate within flow path region 18, centrifugal loading on rotor blades 14 and/or associated components can cause the tip clearance to decrease. Similarly, as hot air flows through flow path region 18, thermal expansion of rotor blades 14 and/or associated components can cause the tip clearance to decrease. The cold tip gap distance can be the distance between rotor blades 14 and shroud 16 (or coating 22) prior to centrifugal loading and/or thermal expansion of rotor blades 14. In examples where height 30 is less than the cold tip gap distance (e.g., in examples that do not include coating 22) and examples where a difference between height 30 and a thickness of coating 22 is less than the cold tip gap distance (e.g., in examples that include coating 22), normal startup and rotation of rotor blades 14 can be accomplished without interference by rub button 12.

According to techniques described herein, a tip clearance between rotor blade 14 and/or a plurality of rotor blades 14 and shroud 16 (or coating 22) can be determined based at least in part on an amount of material of head portion 24 that is ablated by rotor blade 14 during operation of the gas turbine engine. For example, as illustrated in FIG. 1, head portion 24 can include a profile, orthogonal to central axis 32, that varies according to a defined function of height 30 of head portion 24. For instance, as in the example of FIG. 1, head portion 24 can include outer wall 34 that circumscribes head portion 24 to define outer diameter 36 of head portion 24. That is, an outer surface of head portion 24 can be generally cylindrical in shape, such that outer diameter 36 defined by outer wall 34 is substantially constant throughout height 30 of head portion 24. As further illustrated, head portion 24 can include inner wall 38 that extends at angle β away from outer wall 34 toward central axis 32. In this way, an outer diameter of inner wall 38 can vary (e.g., linearly in this example) as a function of height 30. In certain examples, such as the example of FIG. 1, inner wall 38 can extend at angle β away from outer wall 34 to form a vertex at central axis 32, thereby forming a conical recess (or countersink) within head portion 24.

Rub button 12 can include a plurality of known dimensions. For instance, rub button 12 can be formed such that one or more dimensions, such as one or more of outer diameter 36, angle β, and height 30 are known dimensions prior to installation of rub button 12 within shroud 16. Accordingly, a tip clearance between one or more rotor blades 14 and shroud 16 (and/or coating 22) can be determined based at least in part on a difference between the initial height of head portion 24 (e.g., the known height prior to installation) and a height of head portion 24 subsequent to rotation of rotor blades 14 during operation of the gas turbine engine. For example, the tip clearance can be determined as the remaining height of head portion 24 after rotation of rotor blades 14. In some examples, the tip clearance can be determined as the remaining height of head portion 24 less a thickness of coating 22.

As described further below, the tip clearance can be determined based at least in part on a correlation between one or more image dimensions of the profile of head portion 24, one or more of the known dimensions (e.g., known height 30, known outer diameter 36 and/or known angle β), and the defined function by which the profile of head portion 24 varies with height 30. For instance, an image of the profile of head portion 24 (e.g., the profile as viewed from within flow path region 18 and orthogonal central axis 32) can be captured, such as with a borescope device. At least one dimension of the profile of head portion 24 can be measured from the captured image to determine at least one image dimension. For instance, outer diameter 36, as represented in the captured image, can be measured from the captured image. Similarly, an inner diameter spanning inner wall 38, as represented in the captured image, can be measured from the captured image. At least one of the image dimensions can be correlated with at least one corresponding known dimension, thereby scaling the image dimensions to the known dimensions of head portion 24. For instance, the image outer diameter (e.g., the outer diameter of the image corresponding to outer diameter 36) can be correlated with the known outer diameter 36. The inner diameter (e.g., the inner diameter spanning inner wall 38) can be determined based at least in part on the determined scale. Accordingly, the remaining height of head portion 12 (e.g., the height of head portion 24 after a portion of head portion 24 is ablated by rotor blades 14) can be determined based at least in part on the inner diameter and the defined function by which the profile (e.g., the inner diameter in this example) varies according to height 30, as is further described herein. In this way, a tip clearance of rotor blades 14 can be determined from an image of a profile of head portion 24, thereby enabling the tip clearance to be determined without disassembly of the gas turbine engine to retrieve and physically measure rub button 12.

In certain examples, a plurality of rub buttons 12 (e.g., two, five, ten, one hundred, or other numbers of rub buttons 12) can be disposed circumferentially about shroud 16. For instance, a plurality of rub buttons 12 can be disposed at a regular angular interval (e.g., an angular interval such that the angle between each of the plurality of rub buttons 12 is substantially constant). In such examples, the tip clearance of rotor blades 14 can be determined at various locations of shroud 16 corresponding to the location of each of the plurality of rub buttons 12, such as by capturing images of the profiles of the respective rub buttons. Accordingly, the tip clearance measurements at the plurality of locations can provide information corresponding to a travel path of rotor blades 14 with respect to shroud 16, such as whether rotor blades 14 rotate symmetrically or asymmetrically about the central axis of shroud 16.

While the example of FIG. 1 is illustrated as including head portion 24 having outer wall 34 that maintains a substantially constant outer diameter 36 along height 30 and inner wall 38 that extends away from outer wall 34 at angle β, aspects of this disclosure are not so limited. For instance, in other examples, head portion 24 can have other shapes, such as a shape including an angled outer wall, as is further described below. In general, head portion 24 can have any shape such that a profile of head portion 24 varies according to a defined function (e.g., a linear function or a non-linear function) with respect to a height of head portion 24. As such, a remaining height of head portion 24 after operation of rotor blades 14 (and the corresponding tip clearance) can be determined based on a correlation between an image dimension of head portion 24 (e.g., a dimension as measured from an image of the profile of head portion 24), a known dimension of head portion 24 (e.g., to establish an image scale), and the defined function of the profile of head portion 24. Accordingly, system 10, including at least one rub button 12, can be used to determine a tip clearance of rotor blades 14, thereby enabling an engine design that helps minimize gaps and/or excess contact between rotor blades 14 and shroud 16 (and/or coating 22) at one or more engine operating conditions. In this way, techniques of this disclosure can help increase engine cycle efficiencies and engine performance while helping to minimize excess heat and component fatigue that can result from contact between rotor blades 14 and shroud 16 and/or coating 22.

Figure 2:
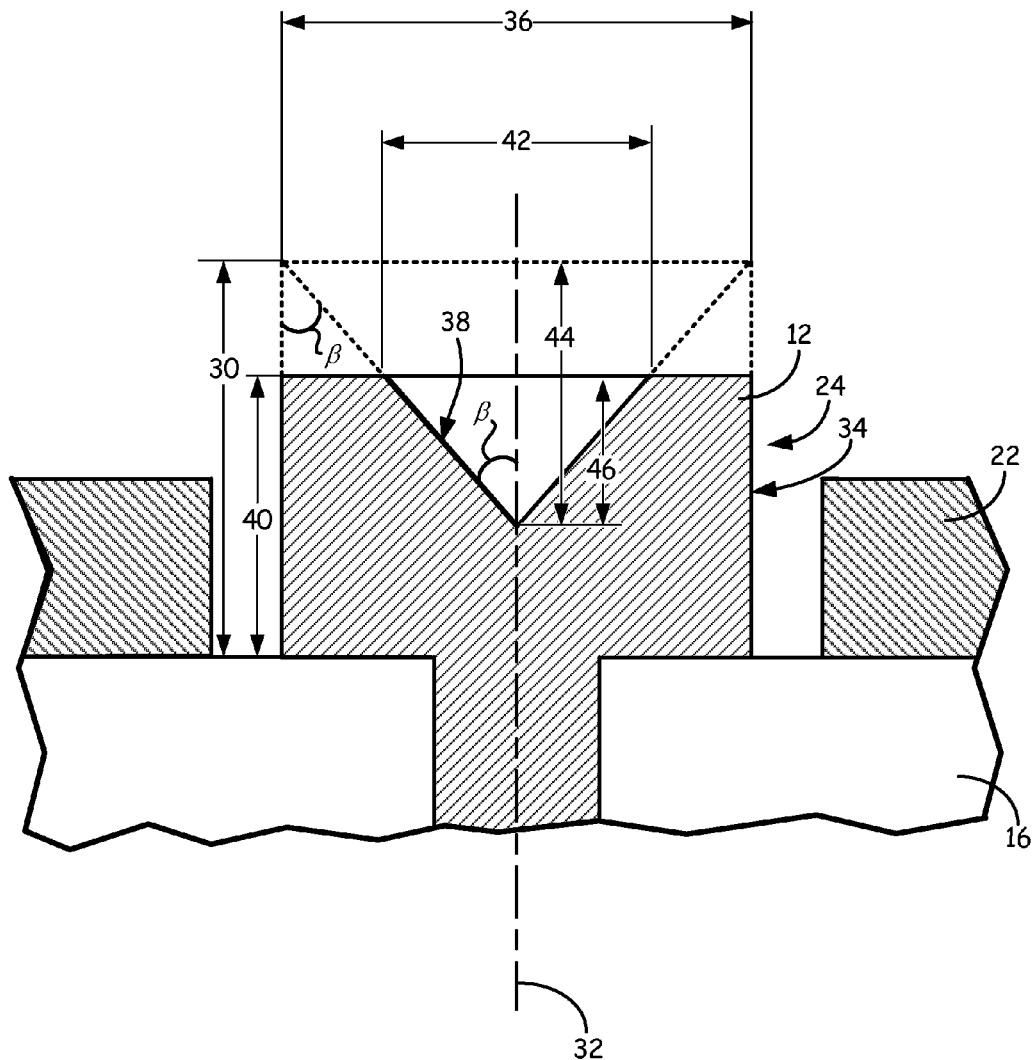
FIG. 2 is a cutaway view of a rub button as illustrated in FIG. 1.

FIG. 2 is a cutaway view of an example of rub button 12 as illustrated in FIG. 1. Specifically, FIG. 2 illustrates, via dashed lines, an example of rub button 12 after one or more rotor blades (e.g. rotor blades 14) have ablated a topmost portion of rub button 12. That is, initial height 30 of head portion 24 is illustrated using dashed lines, and second height 40 represents a remaining height of head portion 24 after the topmost portion of head portion 24 (i.e., the portion of head portion 24 opposite shroud 16) has been ablated by one or more rotor blades.

As illustrated, rub button 12 can include outer wall 34 that circumscribes head portion 24 to define outer diameter 36 of head portion 24. Head portion 24 can also include inner wall 38 that extends at angle β away from outer wall 34 toward central axis 32. As illustrated, outer wall 34 can have substantially constant outer diameter 36 along height 30 and parallel central axis 32. Accordingly, as the angle between central axis 32 and inner wall 38 is an alternating interior angle to the angle by which inner wall 38 extends away from outer wall 34 (i.e., angle β), the angle between central axis 32 and inner wall 38 is also equal to angle β. Rub button 12, including head portion 24, can include a plurality of known dimensions. For instance, physical dimensions of one or more of height 30, outer diameter 36, and angle β can be known (e.g., from design specifications, manufacturing tolerances, measurements after manufacture, and the like).

According to techniques of this disclosure, an image (e.g., a digital image, an analog image, etc.) of a profile of head portion 24 that is orthogonal to central axis 32 can be captured, such as by inserting a borescope device within flow path region 18. As such, the profile can represent a plan view of head portion 24 as viewed along central axis 32 from within flow path region 18. The image can therefore include a representation of both outer wall 34 and inner wall 38 of head portion 24. At least one dimension of the profile can be measured from the captured image to determine at least one image dimension of the profile of head portion 24. As one example, a diameter of outer wall 34 can be measured from the image to determine an outer wall image diameter. Similarly, a diameter spanning inner wall 38 at a topmost extent of head portion 24 (i.e., a diameter spanning inner wall 38 at a topmost region of head portion 24 opposite shroud 16) can be measured from the image to determine an inner wall image diameter. The ratio of outer diameter 36 to inner diameter 42 is therefore equal to a ratio of the outer wall image diameter to the inner wall image diameter. That is, the correlation of outer diameter 36, inner diameter 42, the outer wall image diameter, and the inner wall image diameter can be expressed by the following equation:

$$\frac{D_O}{D_I} = \frac{D_{OI}}{D_{II}}, \qquad \text{(Equation 1)}$$

where $D_O$ represents outer diameter 36 (e.g., a known dimension), $D_I$ represents inner diameter 42, $D_{OI}$ represents the outer wall image diameter (e.g., as measured from the captured image), and $D_{II}$ represents the inner wall image diameter (e.g., as measured from the captured image). In such an example, inner diameter 42 can be determined from the captured image of head portion 24. That is, inner diameter 42 can be expressed in terms of outer diameter 36, the inner wall image diameter, and the outer wall image diameter by the following equation $$D_I = \frac{D_{II}D_O}{D_{OI}} \quad \text{(Equation 2)}$$

In some examples, the tip clearance of the plurality of rotor blades at a location corresponding to rub button 12 can be determined as height 40 (e.g., a remaining height after a topmost portion of head portion 24 is ablated). In certain examples, such as when the system includes coating 22, the tip clearance of the plurality of rotor blades can be determined as a difference between height 40 and a thickness of coating 22.

Height 40, in some examples, can be determined based on a difference between height 30 (e.g., an initial height of head portion 24) and a height of an ablated portion of head portion 24. The height of the ablated portion can be determined as a difference between height 44, extending from an initial topmost extent of head portion 24 to a bottommost extent of inner wall 38 (e.g., a vertex of inner wall 38), and height 46, extending from a topmost extent of head portion 24 (e.g., a topmost portion subsequent to ablation) to the bottommost extent of inner wall 38. That is, height 40, in certain examples, can be expressed by the following equation:

$$H_2 = H_1 - (h_1 - h_2) \quad \text{(Equation 3)}$$

, where $H_2$ represents height 40 (e.g., a remaining portion of head portion 24 subsequent to ablation), $H_1$ represents height 30 (e.g., an initial height of head portion 24 prior to ablation), $h_1$ represents height 44, and $h_2$ represents height 46.

As inner wall 38 extends away from outer wall 34 (and hence center line 32) at angle β, height 44 (i.e., $h_1$) can be expressed in terms of outer diameter 36 (i.e., $D_O$) and angle β by the following equation:

$$h_1 = \frac{D_O}{2\tan\beta} \quad \text{(Equation 4)}$$

Height 46 (i.e., $h_2$) can be expressed in terms of outer diameter 36, the inner wall image diameter, the outer wall image diameter, and angle β by the following equation:

$$h_2 = \frac{D_{II}D_O}{2D_{OI}\tan\beta} \quad \text{(Equation 5)}$$

Accordingly, in the example of FIG. 2, height 40 (e.g., a remaining height of head portion 24 subsequent to ablation) can be expressed by the following equation:

$$H_2 = H_1 - \frac{D_O}{2\tan\beta} + \frac{D_{II}D_O}{2D_{OI}\tan\beta} \quad \text{(Equation 6)}$$

where $H_2$ represents height 40, $H_1$ represents height 30, $D_O$ represents outer diameter 36, β represents angle β, $D_{II}$ represents the inner wall image diameter (e.g., as measured from the captured image), and $D_{OI}$ represents the outer wall image diameter (e.g., as measured from the captured image).

In this way, a remaining height of head portion 24, subsequent to rotation of one or more rotor blades and possible ablation of a portion head portion 24, can be determined using a captured image of a profile of head portion 24. Techniques of this disclosure may therefore enable efficient and cost-effective determinations of a tip clearance between a plurality of rotor blades and a shroud (and/or coating) of a gas turbine engine.

Figure 3:
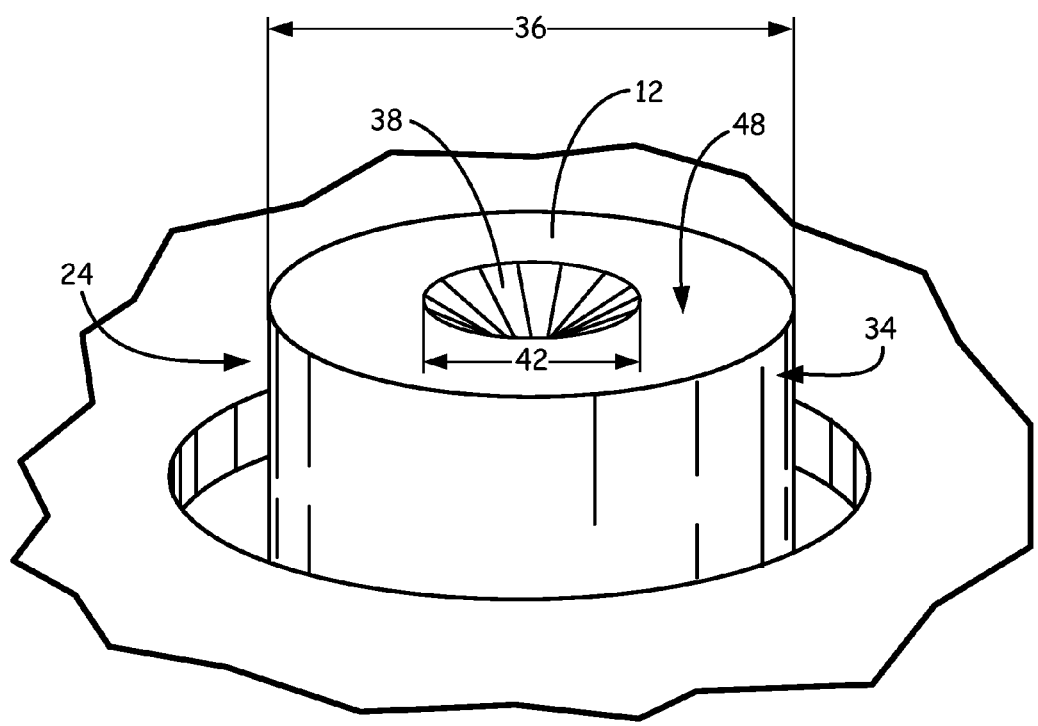
FIG. 3 is a perspective view of a rub button as illustrated in FIG. 2.

FIG. 3 is a perspective view of rub button 12 as illustrated in FIG. 2. As illustrated in FIG. 3, rub button 12 can include outer wall 34 that circumscribes head portion 24 to define outer diameter 36 of head portion 24. As further illustrated, head portion 24 can include inner wall 38 that extends at an angle (e.g., angle β) from outer wall 34 toward a central axis of rub button 12. Inner diameter 42 can be an outer diameter of inner wall 38 at topmost extent 48 of head portion 24.

Figure 4:
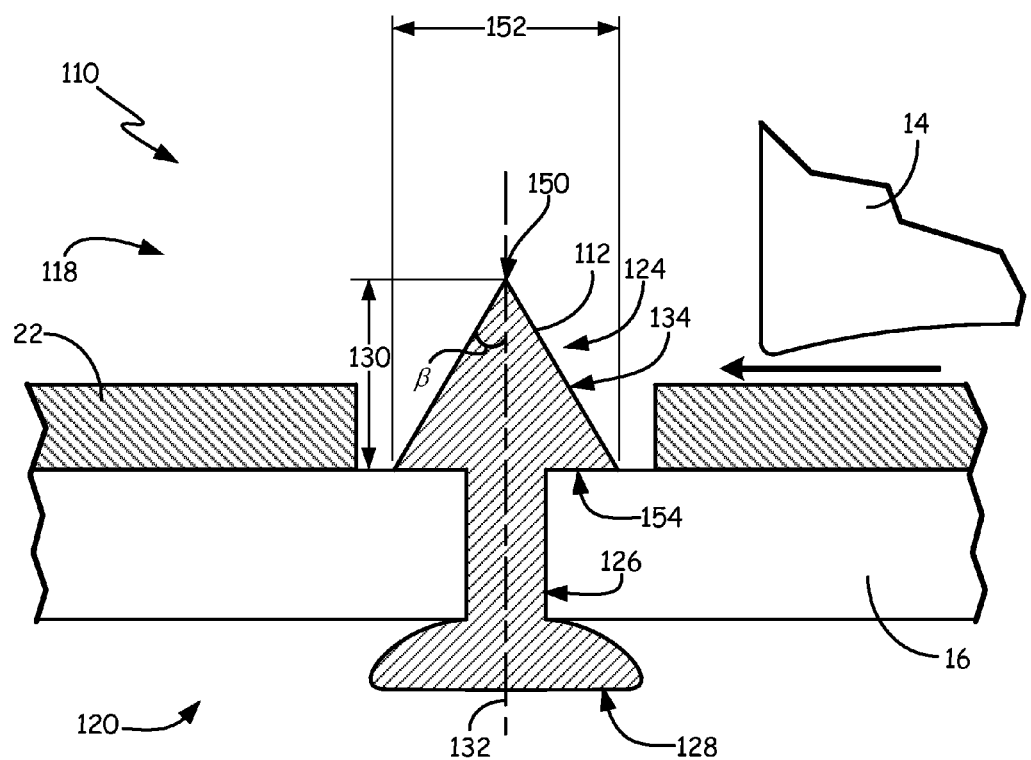
FIG. 4 is a cutaway view of a system including at least one rub button, according to an embodiment.

FIG. 4 is a cutaway view of system 110 including rub button 112, according to an embodiment. System 110 can be, in many respects, similar to system 10 as described above. In general, FIG. 4 illustrates another embodiment of a rub button that can be used to determine a tip clearance between a plurality of rotor blades of a gas turbine engine and a shroud (and/or coating) configured to circumscribe the plurality of rotor blades. As illustrated in FIG. 4, rub button 112 can include head portion 124, shank portion 126, and tail portion 128. Head portion 124 can have height 130 configured to extend into flow path region 118 along central axis 132 of rub button 112. Tail portion 128, opposite head portion 124 along central axis 132, can be configured to be disposed at non-flow path region 120 of shroud 16. Shank portion 126 can extend from tail portion 128 to head portion 124 (e.g., through shroud 16).

As illustrated in FIG. 4, head portion 124 can include a profile, orthogonal to central axis 132, that varies according to a defined function of height 130 of head portion 124. For instance, as in the example of FIG. 4, head portion 124 can include outer wall 134 that circumscribes head portion 124 and extends at an acute angle (e.g., angle β) away from central axis 132 along height 130 from a minimum outer diameter at topmost extent 150 to maximum outer diameter 152 at bottommost extent 154. As illustrated, bottommost extent 154 can be opposite topmost extent 150 and adjacent a side of shroud 16 that is adjacent flow path region 118. In some examples, as in the example of FIG. 4, outer wall 134 can form a vertex at topmost extent 150, such that a minimum outer diameter at topmost extent 150 is substantially zero (e.g., within manufacturing tolerances of zero). In other examples, a minimum outer diameter at topmost extent 150 can be a non-zero diameter.

Rub button 112 can include a plurality of known dimensions. For example, one or more of height 130, maximum diameter 152, and angle β can be known dimensions. A tip clearance between one or more rotor blades 14 and shroud 16 (and/or coating 22) can be determined based at least in part on a difference between initial height 130 (e.g., a known height prior to installation) and a height of head portion 124 subsequent to rotation of one or more rotor blades 14 during operation of the gas turbine engine (e.g., subsequent to ablation of a topmost portion of head portion 124). As described further below, the height of head portion 124 subsequent to rotation of rotor blades 14 (and possible ablation of a topmost portion of head portion 124) can be determined based at least in part on a correlation between at least one image dimension measured from a captured image of the profile of head portion 124, a known dimension of head portion 124 (e.g., outer diameter 152), and the defined function by which the profile of head portion 124 varies as a function of height 130.

Figure 5:
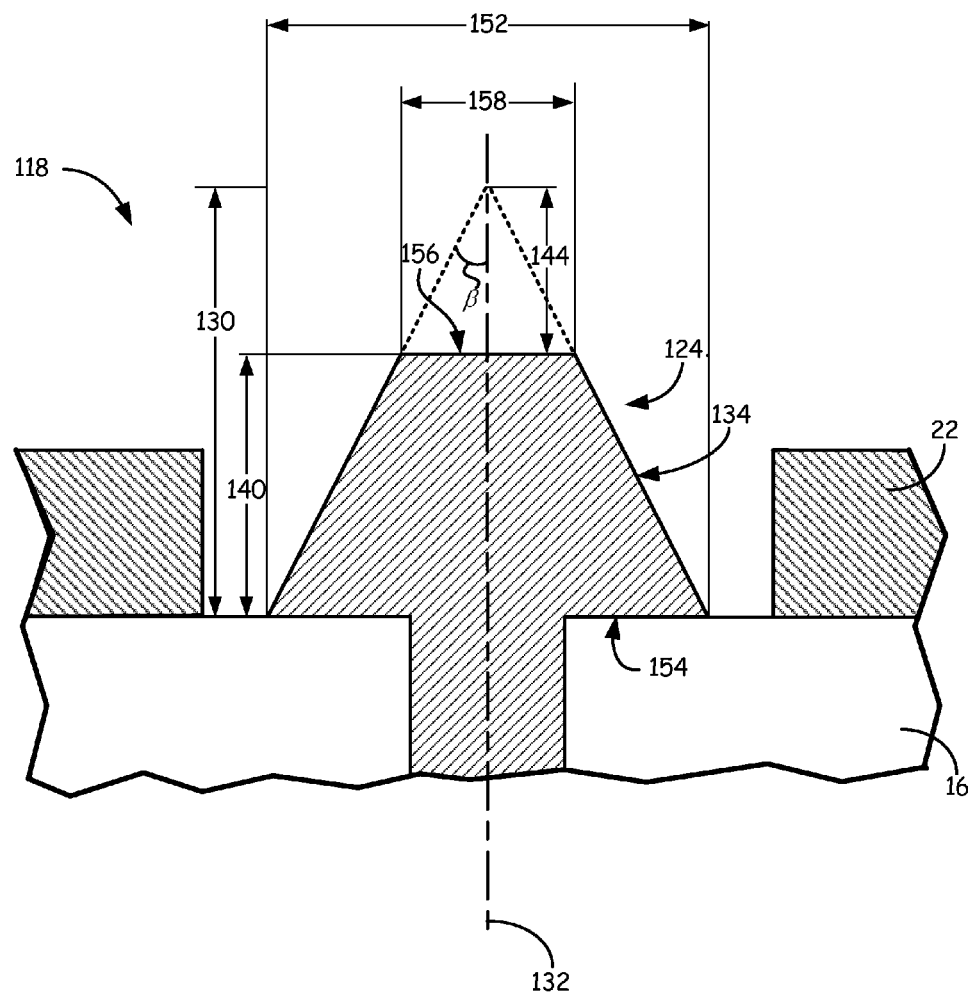
FIG. 5 is a cutaway view of an example of a rub button as illustrated in FIG. 4.

FIG. 5 is a cutaway view of an example of rub button 112 as illustrated in FIG. 4. Specifically, FIG. 5 illustrates, via dashed lines, an example of rub button 112 after one or more rotor blades have ablated a topmost portion of rub button 112. That is, initial height 130 of head portion 124 is illustrated using dashed lines, and second height 140 represents a remaining height of head portion 124 after the topmost portion of head portion 124 (i.e., the portion of head portion 124 opposite shroud 16) has been ablated by one or more rotor blades.

As illustrated, rub button 112 can include outer wall 134 that circumscribes head portion 124 and extends at an angle (e.g., an acute angle, such as angle β) away from central axis 132 along height 130 from minimum outer diameter 158 at topmost extent 156 to maximum outer diameter 152 at bottommost extent 154. As illustrated, bottommost extent 154 can be opposite topmost extent 156 and adjacent a side of shroud 16 that is adjacent flow path region 118. Rub button 112, including head portion 124, can include a plurality of known dimensions, such as one or more of maximum outer diameter 152, height 130, and angle β. For instance, physical dimensions of one or more of height 130, maximum outer diameter 152, and angle β can be known (e.g., from design specifications, manufacturing tolerances, measurements after manufacture, and the like).

According to techniques of this disclosure, an image (e.g., a digital image, an analogue image, etc.) of a profile of head portion 124 that is orthogonal central axis 132 can be captured, such as by inserting a borescope device within flow path region 118. As such, the profile can represent a plan view of head portion 124 as viewed along central axis 132 from within flow path region 118. The image can therefore include a representation of both outer wall 134 extending to maximum outer diameter 152 and topmost extent 156 having minimum outer diameter 158. At least one dimension of the profile can be measured from the captured image to determine at least one image dimension of the profile of head portion 124. As one example, maximum outer diameter 152 can be measured from the image to determine a maximum image outer diameter. Similarly, minimum outer diameter 158 at topmost extent 156 of head portion 24 can be measured from the image to determine a minimum image outer diameter. The ratio of maximum outer diameter 152 to minimum outer diameter 158 is therefore equal to a ratio of the maximum image outer diameter to the minimum image outer diameter. That is, the correlation of maximum outer diameter 152, minimum outer diameter 158, the maximum image outer diameter, and the minimum image outer diameter can be expressed by the following equation:

$$\frac{D_{max}}{D_{min}} = \frac{D_{Imax}}{D_{Imin}}, \qquad \text{(Equation 7)}$$

where, $D_{max}$ represents maximum outer diameter 152 (e.g., a known dimension), $D_{min}$ represents minimum outer diameter 158, $D_{Imax}$ represents the maximum image outer diameter (e.g., as measured from the captured image), and $D_{Imin}$ represents the minimum image outer diameter (e.g., as measured from the captured image). In such an example, minimum outer diameter 158 can be determined from the captured image of head portion 24. That is, minimum outer diameter 158 (i.e., $D_{min}$) can be expressed in terms of maximum outer diameter 152, the minimum image outer diameter, and the maximum image outer diameter by the following equation:

$$D_{min} = \frac{D_{max} D_{Imin}}{D_{Imax}} \qquad \text{(Equation 8)}$$

In some examples, the tip clearance of the plurality of rotor blades at a location corresponding to rub button 112 can be determined as height 140 (e.g., a remaining height after a topmost portion of head portion 124 is ablated). In certain examples, such as when the system includes coating 22, the tip clearance of the plurality of rotor blades can be determined as a difference between height 140 and a thickness of coating 22.

Height 140, in some examples, can be determined based on a difference between height 130 (e.g., an initial height of head portion 24) and a height of an ablated portion of head portion 124. The height of the ablated portion can be determined as a difference between height 130 and height 144 that extends from an initial topmost extent of head portion 24 to topmost extent 156 (e.g., a topmost extent subsequent to ablation). That is, height 140, in certain examples, can be expressed by the following equation:

$$H_2 = H_1 - h, \qquad \text{(Equation 9)}$$

where $H_2$ represents height 140 (e.g., a remaining portion of head portion 24 subsequent to ablation), $H_1$ represents height 130 (e.g., an initial height of head portion 24 prior to ablation), and h represents height 144.

As inner wall 38 extends away from central axis 132 at angle β, height 144 (i.e., can be expressed in terms of minimum outer diameter 158 (i.e., $D_{min}$) and angle β by the following equation:

$$h = \frac{D_{min}}{2\tan\beta} \qquad \text{(Equation 10)}$$

Accordingly, in the example of FIG. 5, height 140 (e.g., a remaining height of head portion 24 subsequent to ablation) can be expressed by the following equation:

$$H_2 = H_1 - \frac{D_{max} D_{Imin}}{2 D_{Imax} \tan\beta}, \qquad \text{(Equation 11)}$$

where $H_2$ represents height 140, $H_1$ represents height 130, $D_{max}$ represents maximum outer diameter 152, $D_{Imin}$ represents the minimum image outer diameter (e.g., as measured from the captured image), $D_{Imax}$ represents the maximum image outer diameter (e.g., as measured from the captured image), and β represents angle β.

In this way, a remaining height of head portion 124, subsequent to rotation of one or more rotor blades and possible ablation of a portion head portion 124, can be determined using a captured image of a profile of head portion 124. As such, a tip clearance of a plurality of rotor blades can be determined, thereby helping to achieve a design that increases cycle performance, efficiencies, and reliability of components of a gas turbine engine. Moreover, by enabling the tip clearance determinations via a captured image of a rub button, the techniques can enable efficient and cost effective analyses.

The following are non-exclusive descriptions of embodiments of the present disclosure.

A system includes a shroud configured to circumscribe a plurality of rotor blades of a gas turbine engine, and at least one rub button including a head portion having a height configured to extend into a flow path region of the shroud along a central axis of the rub button that extends radially into the flow path region. The head portion includes a profile, orthogonal to the central axis, that varies according to a defined function of the height of the head portion.

The system of the preceding paragraph can optionally include, additionally and/or alternatively, any one or more of the following features, configurations, and/or additional components:

The head portion can include an outer wall that circumscribes the head portion to define an outer diameter of the head portion. The head portion can further include an inner wall extending at an acute angle away from the outer wall toward the central axis of the rub button.

An outer diameter of the inner wall, adjacent the outer wall, can be equal to the outer diameter of the head portion.

The inner wall can extend away from the outer wall at the acute angle to form a vertex at the central axis of the rub button.

The head portion can include an outer wall that circumscribes the head portion and extends at an acute angle away from the central axis of the rub button along the height of the head portion from a minimum outer diameter at a topmost extent of the head portion to a maximum outer diameter at a bottommost extent of the head portion. The bottommost extent can be opposite the topmost extent and adjacent a side of the shroud that is adjacent the flow path region.

The defined function of the height of the head portion can be linear with respect to the height of the head portion.

The shroud can include a coating adjacent the flow path region of the shroud. A height of the head portion extending into the flow path region of the shroud can be greater than a thickness of the coating.

Each rotor blade of the plurality of rotor blades can be configured to extend radially from a central axis of the shroud into the flow path region of the shroud. A height of the head portion extending into the flow path region of the shroud can be less than a cold tip gap distance between each respective rotor blade of the plurality of rotor blades and a side of the shroud adjacent the flow path region of the shroud.

The at least one rub button can further include a tail portion, opposite the head portion. The tail portion can be configured to be positioned at a non-flow path region of the shroud. The at least one rub button can further include a shank portion that extends from the tail portion to the head portion. The shank portion can have a height, extending along the central axis of the rub button, that can be equal to a thickness of the shroud.

The at least one rub button can include a plurality of rub buttons disposed circumferentially about the shroud.

The plurality of rub buttons can be circumferentially disposed at a regular angular interval about the shroud.

A method of determining a tip clearance between a plurality of turbine blades of a gas turbine engine and a shroud configured to circumscribe the plurality of turbine blades includes positioning at least one rub button at the shroud. The at least one rub button can include a head portion having a height configured to extend into a flow path region of the shroud along a central axis of the rub button that extends radially into the flow path region. The head portion can include a plurality of known dimensions and a profile, orthogonal to the central axis, that varies according to a defined function of the height of the head portion. The method can further include capturing an image of the head portion of the at least one rub button, and measuring, from the image of the head portion, at least one dimension of the profile of the head portion to determine at least one image dimension of the profile of the head portion. The method can further include determining the tip clearance of the plurality of turbine blades based at least in part on: a correlation between the at least one image dimension of the profile and at least one of the known dimensions; and the defined function of the height of the head portion.

The method of the preceding paragraph can optionally include, additionally and/or alternatively, any one or more of the following operations, features, configurations, and/or additional components:

The height of the head portion can include an initial height of the head portion. Determining the tip clearance of the plurality of turbine blades based at least in part on the correlation and the defined function can include determining a second height of the head portion based on the correlation and the defined function.

Determining the tip clearance of the plurality of turbine blades based at least in part on the correlation and the defined function can include determining the tip clearance of the plurality of turbine blades as the second height of the head portion.

Determining the tip clearance of the plurality of turbine blades based at least in part on the correlation and the defined function can include determining the tip clearance of the plurality of turbine blades as a difference between the second height of the head portion and a thickness of a coating adjacent the flow path region of the shroud.

The head portion can include an outer wall that circumscribes the head portion to define an outer diameter of the head portion, and an inner wall extending at an acute angle away from the outer wall toward the central axis of the rub button. Measuring the at least one dimension of the profile of the head portion can include measuring a diameter of the outer wall to determine an outer wall image diameter and measuring an outer diameter of the inner wall to determine an inner wall image diameter. Determining the tip clearance of the plurality of turbine blades based at least in part on the correlation and the defined function can include determining the tip clearance of the plurality of turbine blades based at least in part on a correlation between the outer wall image diameter, the inner wall image diameter, the outer diameter of the head portion, and the acute angle.

Determining the tip clearance of the plurality of turbine blades based on the correlation and the defined function can include determining the tip clearance of the plurality of turbine blades according to the equation:

$$H_2 = H_1 - \frac{D_O}{2\tan\beta} + \frac{D_{II} D_O}{2 D_{OI} \tan\beta}$$

$H_2$ can be the tip clearance of the plurality of turbine blades. $H_1$ can be the height of the head portion. $D_O$ can be the outer diameter of the head portion. $\beta$ can be the acute angle. $D_{II}$ can be the inner wall image diameter. $D_{OI}$ can be the outer wall image diameter.

The head portion can include an outer wall that circumscribes the head portion and extends at an acute angle away from the central axis of the rub button along the height of the head portion from a minimum outer diameter at a topmost extent of the head portion to a maximum outer diameter at a bottommost extent of the head portion. The bottommost extent can be opposite the topmost extent and adjacent a side of the shroud that is adjacent the flow path region. One of the known dimensions of the plurality of known dimensions of the head portion can include the maximum outer diameter at the bottommost extent of the head portion. Measuring, from the image of the head portion, the at least one dimension of the profile of the head portion can include measuring the minimum outer diameter at the topmost extent of the head portion to determine a minimum image outer diameter and measuring the maximum outer diameter at the bottommost extent of the head portion to determine a maximum image outer diameter. Determining the tip clearance of the plurality of turbine blades based at least in part on the correlation and the defined function can include determining the tip clearance of the plurality of turbine blades based at least in part on a correlation between the minimum image outer diameter, the maximum image outer diameter, the maximum outer diameter of the head portion, and the acute angle.

Determining the tip clearance of the plurality of turbine blades based on the correlation and the defined function comprises determining the tip clearance of the plurality of turbine blades according to the equation:

$$H_2 = H_1 - \frac{D_{max} D_{Imin}}{2 D_{Imax} \tan \beta}$$

$H_2$ can be the tip clearance of the plurality of turbine blades. $H_1$ can be the height of the head portion. $D_{max}$ can be the maximum outer diameter at the bottommost extent of the head portion. $D_{Imin}$ can be the minimum image outer diameter. $D_{Imax}$ can be the maximum image outer diameter. $\beta$ can be the acute angle.

Capturing the image of the head portion of the at least one rub button comprises capturing the image of the head portion of the at least one rub button using a borescope device.

A rub button includes a head portion having a height that extends radially along a central axis of the rub button. The rub button further includes a tail portion, opposite the head portion, and a shank portion that extends along the central axis of the rub button from the tail portion to the head portion. The head portion includes a profile, orthogonal to the central axis, that varies according to a linear function of the height of the head portion.

The foregoing features and elements may be combined in various combinations without exclusivity, unless expressly indicated otherwise. While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
a shroud configured to circumscribe a plurality of rotor blades of a gas turbine engine; and
at least one rub button comprising:
a head portion having a height configured to extend into a flow path region of the shroud along a central axis of the rub button that extends radially into the flow path region, the head portion comprising a profile, orthogonal to the central axis, that varies according to a defined function of the height of the head portion;
a tail portion, opposite the head portion, the tail portion configured to be positioned at a non-flow path region of the shroud; and
a shank portion that extends from the tail portion to the head portion, the shank portion having a height, extending along the central axis of the rub button, that is equal to a thickness of the shroud.

2. The system of claim 1, wherein the head portion comprises:
an outer wall that circumscribes the head portion to define an outer diameter of the head portion; and
an inner wall extending at an acute angle away from the outer wall toward the central axis of the rub button.

3. The system of claim 2, wherein an outer diameter of the inner wall, adjacent the outer wall, is equal to the outer diameter of the head portion.

4. The system of claim 2, wherein the inner wall extends away from the outer wall at the acute angle to form a vertex at the central axis of the rub button.

5. The system of claim 1, wherein the head portion comprises an outer wall that circumscribes the head portion and extends at an acute angle away from the central axis of the rub button along the height of the head portion from a minimum outer diameter at a topmost extent of the head portion to a maximum outer diameter at a bottommost extent of the head portion, the bottommost extent opposite the topmost extent and adjacent a side of the shroud that is adjacent the flow path region.

6. The system of claim 1, wherein the defined function of the height of the head portion is linear with respect to the height of the head portion.

7. The system of claim 1,
wherein the shroud comprises a coating adjacent the flow path region of the shroud, and
wherein a height of the head portion extending into the flow path region of the shroud is greater than a thickness of the coating.

8. The system of claim 1,
wherein each rotor blade of the plurality of rotor blades is configured to extend radially from a central axis of the shroud into the flow path region of the shroud, and
wherein a height of the head portion extending into the flow path region of the shroud is less than a cold tip gap distance between each respective rotor blade of the plurality of rotor blades and a side of the shroud adjacent the flow path region of the shroud.

9. The system of claim 1, wherein the at least one rub button comprises a plurality of rub buttons disposed circumferentially about the shroud.

10. The system of claim 9, wherein the plurality of rub buttons is circumferentially disposed at a regular angular interval about the shroud.

11. A method of determining a tip clearance between a plurality of rotor blades of a gas turbine engine and a shroud configured to circumscribe the plurality of rotor blades, the method comprising:
positioning at least one rub button at the shroud, the at least one rub button comprising a head portion, a tail portion, and a shank portion, the head portion having a height configured to extend into a flow path region of the shroud along a central axis of the rub button that extends radially into the flow path region, the head portion comprising a plurality of known dimensions and a profile, orthogonal to the central axis, that varies according to a defined function of the height of the head portion, the tail portion opposite the head portion and configured to be positioned at a non-flow path region of the shroud, the shank portion extending from the tail portion to the head portion, the shank portion having a height, extending along the central axis of the rub button, that is equal to a thickness of the shroud;

capturing an image of the head portion of the at least one rub button;

measuring, from the image of the head portion, at least one dimension of the profile of the head portion to determine at least one image dimension of the profile of the head portion; and determining the tip clearance of the plurality of rotor blades based at least in part on:
  a correlation between the at least one image dimension of the profile and at least one of the known dimensions; and
  the defined function of the height of the head portion.

12. The method of claim 11,
wherein the height of the head portion comprises an initial height of the head portion, and
wherein determining the tip clearance of the plurality of rotor blades based at least in part on the correlation and the defined function comprises determining a second height of the head portion based on the correlation and the defined function.

13. The method of claim 11, wherein determining the tip clearance of the plurality of rotor blades based at least in part on the correlation and the defined function comprises determining the tip clearance of the plurality of rotor blades as the second height of the head portion.

14. The method of claim 11, wherein determining the tip clearance of the plurality of rotor blades based at least in part on the correlation and the defined function comprises determining the tip clearance of the plurality of rotor blades as a difference between the second height of the head portion and a thickness of a coating adjacent the flow path region of the shroud.

15. The method of claim 11,
wherein the head portion comprises:
  an outer wall that circumscribes the head portion to define an outer diameter of the head portion; and
  an inner wall extending at an acute angle away from the outer wall toward the central axis of the rub button,
wherein measuring the at least one dimension of the profile of the head portion comprises measuring a diameter of the outer wall to determine an outer wall image diameter and measuring an outer diameter of the inner wall to determine an inner wall image diameter, and
wherein determining the tip clearance of the plurality of rotor blades based at least in part on the correlation and the defined function comprises determining the tip clearance of the plurality of rotor blades based at least in part on a correlation between the outer wall image diameter, the inner wall image diameter, the outer diameter of the head portion, and the acute angle.

16. The method of claim 15, wherein determining the tip clearance of the plurality of rotor blades based on the correlation and the defined function comprises determining the tip clearance of the plurality of rotor blades according to the equation:

$$H_2 = H_1 - \frac{D_O}{2\tan\beta} + \frac{D_{II} D_O}{2 D_{OI} \tan\beta},$$

wherein $H_2$ is the tip clearance of the plurality of rotor blades, $H_1$ is the height of the head portion, $D_o$ is the outer diameter of the head portion, $\beta$ is the acute angle, $D_{II}$ is the inner wall image diameter, and $D_{o1}$ is the outer wall image diameter.

17. The method of claim 11,
wherein the head portion comprises an outer wall that circumscribes the head portion and extends at an acute angle away from the central axis of the rub button along the height of the head portion from a minimum outer diameter at a topmost extent of the head portion to a maximum outer diameter at a bottommost extent of the head portion, the bottommost extent opposite the topmost extent and adjacent a side of the shroud that is adjacent the flow path region,
wherein one of the known dimensions of the plurality of known dimensions of the head portion comprises the maximum outer diameter at the bottommost extent of the head portion,
wherein measuring, from the image of the head portion, the at least one dimension of the profile of the head portion comprises measuring the minimum outer diameter at the topmost extent of the head portion to determine a minimum image outer diameter and measuring the maximum outer diameter at the bottommost extent of the head portion to determine a maximum image outer diameter, and
wherein determining the tip clearance of the plurality of rotor blades based at least in part on the correlation and the defined function comprises determining the tip clearance of the plurality of rotor blades based at least in part on a correlation between the minimum image outer diameter, the maximum image outer diameter, the maximum outer diameter of the head portion, and the acute angle.

18. The method of claim 17, wherein determining the tip clearance of the plurality of rotor blades based on the correlation and the defined function comprises determining the tip clearance of the plurality of rotor blades according to the equation:

$$H_2 = H_1 - \frac{D_{max} D_{Imin}}{2 D_{Imax} \tan\beta},$$

wherein $H_2$ is the tip clearance of the plurality of rotor blades, $H_1$ is the height of the head portion, $D_{max}$ is the maximum outer diameter at the bottommost extent of the head portion, $D_{Imin}$ is the minimum image outer diameter, $D_{Imax}$ is the maximum image outer diameter, and $\beta$ is the acute angle.

* * * * *